(12) United States Patent
Oh et al.

(10) Patent No.: US 10,261,316 B2
(45) Date of Patent: Apr. 16, 2019

(54) HEAD-UP DISPLAY CONTROL APPARATUS AND METHOD

(71) Applicant: Hyundai Autron Co., Ltd., Seongnam-si (KR)

(72) Inventors: Hyung Suk Oh, Yongin-si (KR); Byung Jik Keum, Seoul (KR)

(73) Assignee: Hyundai Autron Co., Ltd., Seongnam-si (KR)

( * ) Notice: Subject to any disclaimer, the term of this patent is extended or adjusted under 35 U.S.C. 154(b) by 81 days.

(21) Appl. No.: 15/347,673

(22) Filed: Nov. 9, 2016

(65) Prior Publication Data

US 2017/0131550 A1    May 11, 2017

(30) Foreign Application Priority Data

Nov. 10, 2015    (KR) .................. 10-2015-0157768

(51) Int. Cl.
| | |
|---|---|
| *B60K 35/00* | (2006.01) |
| *G02B 27/01* | (2006.01) |
| *G06T 3/40* | (2006.01) |
| *G06T 11/60* | (2006.01) |
| *B60R 1/00* | (2006.01) |

(52) U.S. Cl.
CPC ............ *G02B 27/0101* (2013.01); *G06T 3/40* (2013.01); *G06T 11/60* (2013.01); *B60R 1/00* (2013.01); *B60R 2300/205* (2013.01); *G02B 2027/014* (2013.01); *G02B 2027/0138* (2013.01); *G02B 2027/0141* (2013.01)

(58) Field of Classification Search
CPC .......... G02B 27/0101; G02B 2027/014; G02B 2027/0141; G02B 2027/0138; G06T 3/40; G06T 11/60; B60R 2300/205; B60R 1/00
See application file for complete search history.

(56) References Cited

U.S. PATENT DOCUMENTS

| | | | |
|---|---|---|---|
| 9,598,013 B2* | 3/2017 | Oh ........................... | B60R 1/00 |
| 2003/0072570 A1* | 4/2003 | Seo ........................ | G03B 35/00 |
| | | | 396/331 |
| 2006/0178787 A1* | 8/2006 | McCall .................. | B60R 1/002 |
| | | | 701/1 |
| 2009/0140845 A1* | 6/2009 | Hioki ..................... | B60K 35/00 |
| | | | 340/425.5 |
| 2011/0063436 A1* | 3/2011 | Mizutani ................ | G01S 11/12 |
| | | | 348/135 |

(Continued)

FOREIGN PATENT DOCUMENTS

| | | |
|---|---|---|
| CN | 1898961 A | 1/2007 |
| CN | 101464562 A | 6/2009 |

(Continued)

*Primary Examiner* — Sathyanaraya V Perungavoor
*Assistant Examiner* — Howard D Brown, Jr.
(74) *Attorney, Agent, or Firm* — Morgan, Lewis & Bockius LLP

(57) ABSTRACT

An HUD (Head-Up Display) control apparatus may include: a distance detector configured to detect a distance to an obstacle in front of a vehicle; and a controller configured to adjust a virtual image formation position of HUD information to a closer position in response to the distance, when the obstacle is located at a closer position than a virtual image formation position in a specific range designed in an HUD.

8 Claims, 4 Drawing Sheets

(56) References Cited

U.S. PATENT DOCUMENTS

| | | | | |
|---|---|---|---|---|
| 2011/0222176 A1* | 9/2011 | Browne | ............... | B60R 1/072 |
| | | | | 359/846 |
| 2016/0071416 A1* | 3/2016 | Kim | ............... | G01S 7/4802 |
| | | | | 701/70 |
| 2016/0082840 A1* | 3/2016 | Yoshida | ............... | B60K 35/00 |
| | | | | 701/36 |
| 2016/0170412 A1* | 6/2016 | Yamamoto | ............. | G05D 1/024 |
| | | | | 701/23 |
| 2017/0254659 A1* | 9/2017 | Fukumoto | ............. | B60K 35/00 |

FOREIGN PATENT DOCUMENTS

| | | |
|---|---|---|
| CN | 104039578 A | 9/2014 |
| CN | 104512354 A | 4/2015 |
| CN | 105163972 A | 12/2015 |
| JP | 2004168230 A | 6/2004 |
| JP | 2008-114672 A | 5/2008 |
| JP | 2009-288388 A | 12/2009 |
| JP | 5267727 B2 | 5/2013 |
| JP | 2015-197496 A | 11/2015 |
| KR | 10-2009-0076242 A | 7/2009 |

\* cited by examiner

HEAD-UP DISPLAY CONTROL APPARATUS AND METHOD

CROSS-REFERENCES TO RELATED APPLICATIONS

The present application claims priority to Korean application number 10-2015-0157768, filed on Nov. 10, 2015, the entire contents of which is incorporated herein for all purposes by this reference.

BACKGROUND OF THE INVENTION

Field of the Invention

The present invention relates to an HUD (Head-Up Display) control apparatus and method, and more particularly, to an HUD control apparatus and method which is capable of adjusting a virtual image formation position by adjusting a mechanism of an HUD according to a distance to a target object in front of a vehicle.

Description of Related Art

Recently, most vehicles have a navigation system mounted therein to provide a destination and road guide to a driver. Furthermore, vehicles having an HUD mounted therein have also been on the market, the HUD projecting desired information onto the windshield of the corresponding vehicle and enabling a driver to acquire the projected information while the driver keeps eyes forward.

Furthermore, research is being conducted on a method for displaying specific information in the form of AR (Augmented Reality) through the HUD.

The AR indicates a technique for turning the environment around a user into a digital interface by placing 3D virtual objects in the real world seen by the user. Since the AR mixes a virtual world having additional information with the real world in real time and shows the mixed world as one video, the AR is also referred to as MR (Mixed Reality).

A conventional HUD has a virtual image display position (or virtual image formation position) which is physically fixed in a specific range.

For example, the HUD could associate HUD information on only a target object within a specific range of 8 m to 15 m with the position of the target object, and display the target object with the HUD information. Therefore, when the target object is located at a position closer than the specific range (for example, during city driving), the target object deviates from the range in which the display position of HUD information can be adjusted. Thus, the HUD information appears to overlap the target object or is not matched with the target object.

In order to solve such a problem, there is a demand for a method capable of accurately displaying HUD information at a position corresponding to a distance to a target object from a vehicle, when the target object is located at a position deviating from a specific range in which HUD information can be displayed through software adjustment, the specific range indicating a physical specific range in which an HUD can display HUD information.

The related art of the present invention is disclosed in Korean Patent Publication No. 10-2009-0076242 published on Jul. 13, 2009 and entitled "HUD for vehicle and operation control method thereof".

BRIEF SUMMARY

Various embodiments of the present invention are directed to an HUD control apparatus and method which is capable of adjusting a virtual image formation position by adjusting a mechanism of an HUD according to a distance to a target object in front of a vehicle.

In one embodiment, an HUD control apparatus may include: a distance detector configured to detect a distance to an obstacle in front of a vehicle; and a controller configured to adjust a virtual image formation position of HUD information to a closer position in response to the distance, when the obstacle is located at a closer position than a virtual image formation position in a specific range designed in an HUD.

The controller may adjust a distance to a flat mirror that reflects the HUD information on a screen onto which the HUD information is outputted, in order to adjust the virtual image formation position of the HUD information in response to the distance information from the vehicle to the obstacle.

The controller may move the flat mirror away from or close to the screen, using a motor.

A distance for moving the flat mirror in response to the distance from the vehicle to the obstacle may be previously stored in the form of a lookup table in a memory.

When the flat mirror is moved close to or away from the screen, the controller may adjust a reflection angle of the flat mirror depending on the moving distance of the flat mirror such that the center of the HUD information which is reflected from the flat mirror and transmitted to the aspheric mirror is not changed.

The controller may adjust the reflection angle of the flat mirror using a motor.

The reflection angle of the flat mirror, which is to be adjusted according to the moving distance of the flat mirror, may be previously stored in a form of a lookup table in a memory.

In another embodiment, an HUD control method may include: sensing, by a controller, an obstacle in front of a vehicle through an obstacle sensor; detecting a distance to the obstacle from the vehicle through a distance detector; and adjusting a virtual image formation position of HUD information to a closer position in response to the distance, when the obstacle is located at a closer position than a virtual image formation position in a specific range designed in an HUD.

In the adjusting of the virtual image formation position, the controller may adjust a distance to a flat mirror that reflects the HUD information on a screen onto which the HUD information is outputted, in order to adjust the virtual image formation position of the HUD information in response to the distance information from the vehicle to the obstacle.

The controller may move the flat mirror away from or close to the screen, using a motor, and a distance for moving the flat mirror in response to the distance from the vehicle to the obstacle may be previously stored in the form of a lookup table in a memory.

The HUD control method may further include adjusting, by the controller, a reflection angle of the flat mirror such that the center of the HUD information which is reflected from the flat mirror and transmitted to the aspheric mirror is not changed, when the flat mirror is moved close to or away from the screen.

The controller may adjust the reflection angle of the flat mirror using a motor, and the reflection angle of the flat mirror, which is to be adjusted according to the moving distance of the flat mirror, may be previously stored in the form of a lookup table in a memory.

DETAILED DESCRIPTION

Hereafter, an HUD (Head-Up Display) control apparatus and method in accordance with embodiments of the present invention will be described in detail with reference to the accompanying drawings.

Throughout the specification, it should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
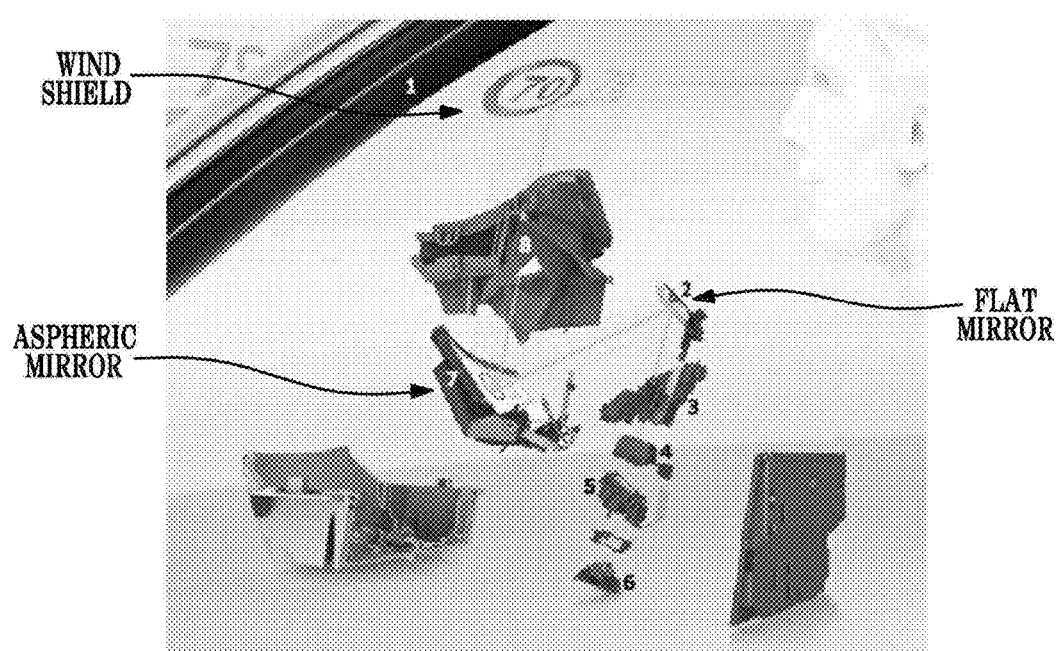
FIG. 1 is a photograph for describing an aspheric mirror used in a general HUD.

FIG. 1 is a photograph for describing a configuration of an aspheric mirror and a flat mirror in an HUD (Head-Up Display) which is related to an embodiment of the present invention.

As illustrated in FIG. 1, the HUD for a vehicle reflects and displays HUD information on a windshield of the vehicle through an aspheric mirror for HUD, corresponding to the aspheric shape (that is, curved surface) of the windshield.

The HUD information (video) is incident on the aspheric mirror after the HUD information (video) displayed on a screen is reflected through the flat mirror.

As the HUD information reflected through the aspheric mirror is displayed on the aspheric windshield, the HUD information which is not distorted but has a normal ratio is displayed on the windshield.

For reference, the aspheric surface refers to a curved surface which slightly deviates from a spherical surface. Since the spherical surface is easy to manufacture or test, a coaxial optical system is typically used. However, when an optical system with a small aberration is configured on a small number of surfaces, the aspheric surface is more frequently used. In order to manufacture the aspheric mirror, a separate aspheric mirror is precisely injection-molded according to the type of each vehicle.

As described above, however, when a target object is located at a position closer than the specific range designed in the HUD (for example, during city driving), the target object deviates from the range in which an HUD information display position (virtual image formation position) can be adjusted in software manner. Thus, the HUD information appears to overlap the target object or is not matched with the target object.

Thus, in the present embodiment, the position of the flat mirror may be moved close to the screen such that a virtual image formation position can be adjusted to a closer position than a specific range designed in the HUD. Therefore, when the target object is located at a closer position than the specific range designed in the HUD (for example, during city driving), the HUD information display position (virtual image formation position) may be adjusted to a closer position, such that the HUD information does not appear to overlap the target object.

Figure 2:
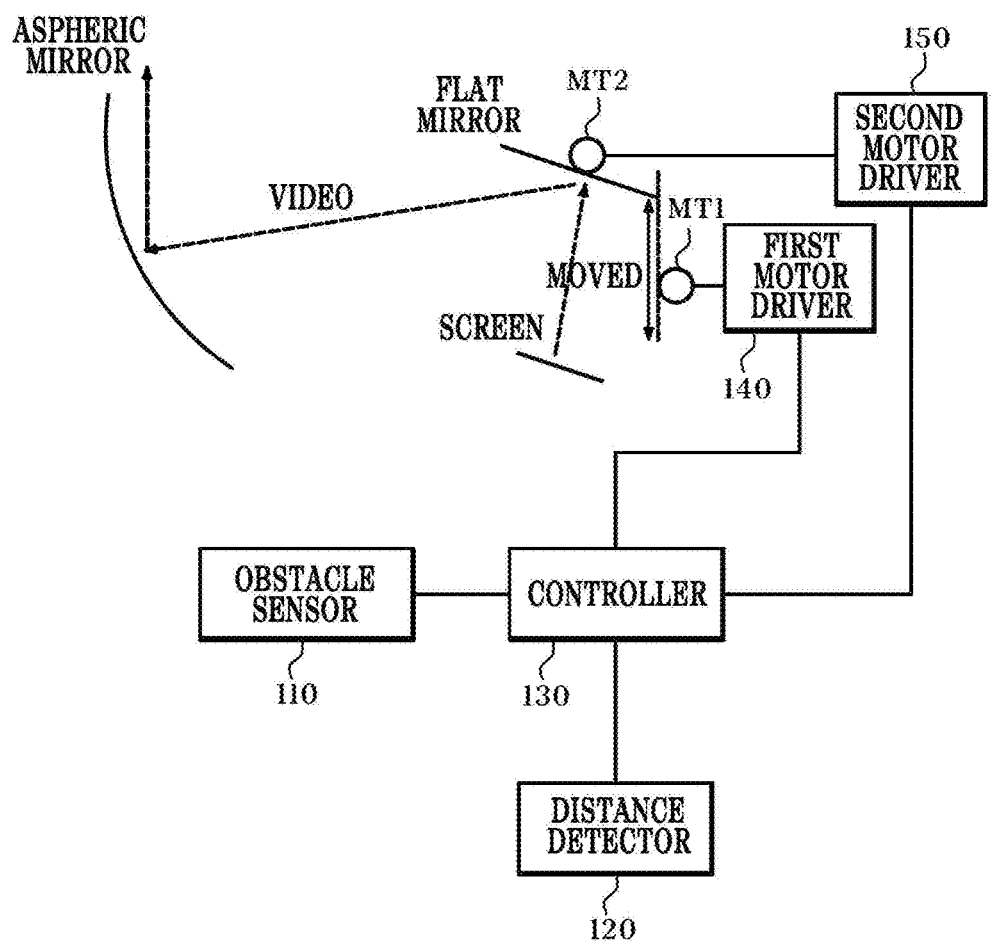
FIG. 2 is a diagram illustrating a schematic configuration of an HUD control apparatus in accordance with an embodiment of the present invention.

FIG. 2 is a diagram illustrating a schematic configuration of an HUD control apparatus in accordance with an embodiment of the present invention.

As illustrated in FIG. 2, the HUD display control apparatus in accordance with the embodiment of the present invention includes an obstacle sensor 110, a distance detector 120, a controller 130, a first motor MT1, a first motor driver 140, a second motor MT2 and a second motor driver 150.

The obstacle sensor 110 senses an obstacle (target object) in front of a vehicle.

The obstacle sensor 110 may sense an obstacle using a LiDAR (Light Detection And Ranging) sensor, radar sensor or camera. The obstacle sensor 110 is not limited thereto, but may further include other obstacle sensors (for example, ultrasonic sensor, infrared sensor and the like).

For reference, the LiDAR sensor refers to a sensor that measures a time required until a laser pulse is returned after the laser pulse is emitted, in order to measure the position coordinate of a reflecting body.

The distance detector 120 may detect a signal reflected from an obstacle (for example, pedestrian, vehicle, wall or article) in the viewing direction (or driving direction), and detect a distance between the obstacle and the vehicle and the position (or distance) of the obstacle with respect to the vehicle.

In the present embodiment, the functions of the obstacle sensor 110 and the distance detector 120 are separately described, for convenience of description. Depending on embodiments, however, the obstacle sensor 110 and the distance detector 120 may be integrated with each other.

The controller 130 determines whether the HUD information display position (virtual image formation position) needs to be adjusted, based on the distance to the obstacle in the viewing direction (or driving direction), which is obtained according to the information detected through the distance detector 120.

For example, the controller 130 determines that the HUD information display position (virtual image formation position) needs to be adjusted to a closer position, when the target object is located at a closer position than the virtual image formation position range (for example, 8 m to 15 m) designed in the HUD (for example, during city driving).

The first motor driver 140 drives the first motor MT1 to move the flat mirror close to or away from the screen, according to the control of the controller 130.

For example, when it is determined that the HUD information display position (virtual image formation position) needs to be adjusted to a closer position, the first motor driver 140 drives the first motor MT1 to move the flat mirror close to the screen. On the other hand, when it is determined that the HUD information display position (virtual image formation position) needs to be adjusted to a remoter position in a state where the flat mirror is located close to the screen, the first motor driver 140 drives the first motor MT1 to move the flat mirror away from the screen (refer to FIGS. 3A to 3C).

At this time, the moving distance (displacement) of the flat mirror, corresponding to the distance from the vehicle to the obstacle, may be previously stored in the form of a lookup table in an internal memory (not illustrated).

However, when the flat mirror is moved close to or away from the screen, the reflection angle of the flat mirror needs to be adjusted in such a manner that the center in direction of light which is reflected from the flat mirror and transmitted toward the aspheric mirror is not changed.

Therefore, the controller 130 calculates a reflection angle for adjusting the flat mirror in response to the moving distance (displacement) of the flat mirror, and controls the second motor driver 150.

Figure 3:
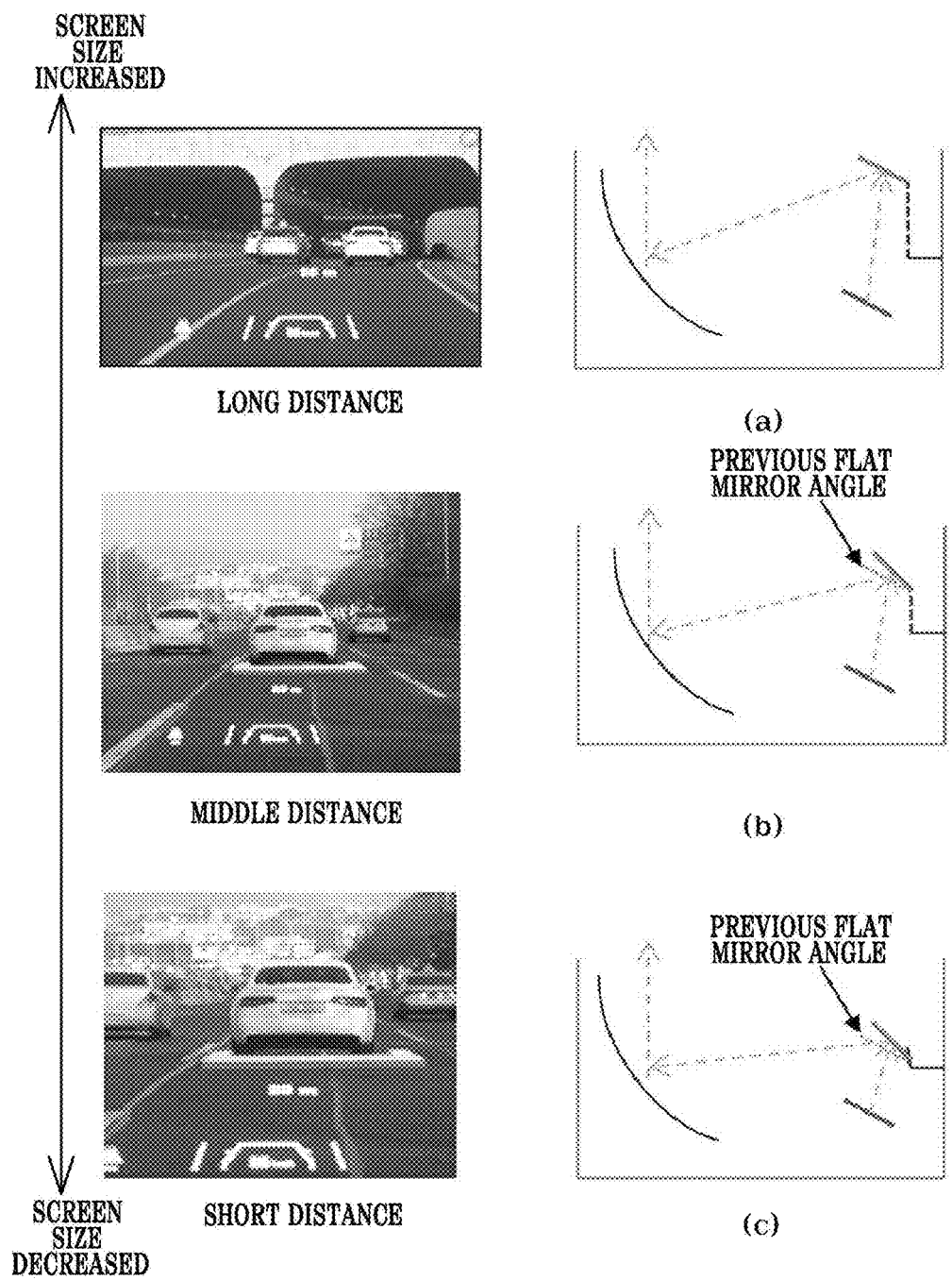
FIG. 3 is a diagram for describing a reflection angle adjusting operation of a flat mirror, when the flat mirror is moved close to or away from a screen in FIG. 2.

The second motor driver 150 drives the second motor MT2 to adjust the reflection angle of the flat mirror, according to the control of the controller 130 (refer to FIGS. 3B and 3C).

FIGS. 3A to 3C are diagrams for describing a reflection angle adjusting operation of the flat mirror, when the flat mirror is moved close to or away from the screen in FIG. 2.

As illustrated in FIG. 3A, when the flat mirror is located at the remotest position from the screen, a virtual image is formed at the maximum distance (for example, 15 m). As illustrated in FIG. 3B, when the flat mirror is moved to a closer position to the screen, a virtual image is formed at a shorter distance (for example, 8 m). Furthermore, as illustrated in FIG. 3C, when the flat mirror is moved to the closest position to the screen, a virtual image is formed at the shortest distance (for example, 2.5 m). At this time, as the flat mirror gets close to the screen, the size of a screen on which the HUD video is displayed, that is, the screen size of the HUD video displayed on the windshield tends to decrease.

Furthermore, as the flat mirror is away from or close to the screen, the reflection angle of the flat mirror needs to be adjusted in such a manner that the center in direction of light which is reflected through the flat mirror and transmitted to the aspheric mirror is not changed.

Therefore, as the flat mirror is close to or away from the screen, the controller 130 adjusts the reflection angle of the flat mirror through the second motor driver 150 in response to the moving distance (displacement) of the flat mirror.

At this time, the reflection angle of the flat mirror, which needs to be adjusted according to the moving distance (displacement), may be previously stored in the form of a lookup table in the internal memory (not illustrated).

Figure 4:
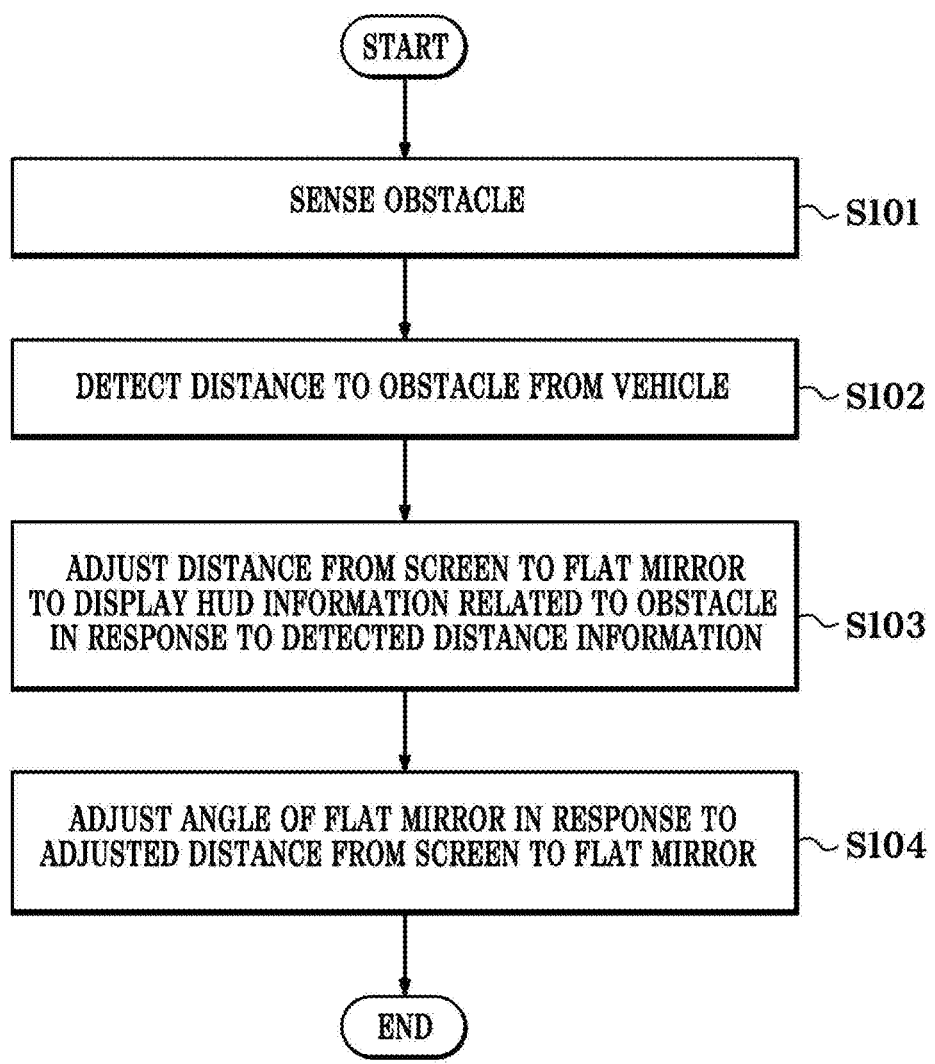
FIG. 4 is a flowchart illustrating an HUD display control method in accordance with an embodiment of the present invention.

FIG. 4 is a flowchart showing an HUD display control method in accordance with an embodiment of the present invention.

As shown in FIG. 4, the controller 130 senses an obstacle (target object) in front of the vehicle through the obstacle sensor 110 at step S101.

When the obstacle is sensed, the controller 130 detects a distance to the obstacle from the vehicle through the distance detector 120 at step S102.

For example, when the vehicle travels around the city, the distance to the obstacle from the vehicle is relatively short in most cases. Furthermore, when the vehicle travels in the suburbs, the distance to the obstacle from the vehicle is relatively long in most cases.

Thus, when the obstacle is located at a closer position than a specific range (that is, virtual image formation position) designed in the HUD (for example, during city driving), the controller 130 adjusts the HUD information display position (virtual image formation position) to a closer position such that the HUD information does not appear to overlap the obstacle.

The controller 130 adjusts the distance from the screen to the flat mirror in order to display the HUD information related to the obstacle in response to the detected distance information (that is, distance information from the vehicle to the obstacle), at step S103.

For example, when it is determined that the HUD information display position (virtual image formation position) needs to be adjusted to a closer position, the controller 130 moves the flat mirror close to the screen. On the other hand, when it is determined that the HUD information display position (virtual image formation position) needs to be adjusted to a remoter position in a state where the flat mirror is close to the screen, the controller 130 moves the flat mirror away from the screen.

At this time, the moving distance (displacement) of the flat mirror, corresponding to the distance from the vehicle to the obstacle, may be previously stored in the form of a lookup table in an internal memory (not illustrated).

Then, the controller 130 adjusts the reflection angle of the flat mirror in response to the moving distance (displacement) of the flat mirror at step S104.

That is, when the flat mirror is moved close to or away from the screen, the controller 130 adjusts the reflection angle of the flat mirror such that that the center in direction of light which is reflected from the flat mirror and transmitted to the aspheric mirror is not changed.

At this time, the reflection angle of the flat mirror, which needs to be adjusted according to the moving distance (displacement), may be previously stored in the form of a lookup table in the internal memory (not illustrated).

In accordance with the present embodiment, the HUD control apparatus and method can adjust a virtual image formation position by adjusting the position of a component (that is, the flat mirror) of the HUD according to a distance to an obstacle (target object) in front of the vehicle, such that HUD information can be accurately displayed at a position corresponding to the distance to the target object from the vehicle.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An HUD (Head-Up Display) control apparatus comprising:
 a distance detector configured to detect a distance to an obstacle in front of a vehicle; and
 a controller configured to adjust a virtual image formation position of HUD information to a closer position in response to the distance between the obstacle and the vehicle so that the HUD information does not overlap the obstacle on a windshield of the vehicle, when the obstacle is located at a closer position than a virtual image formation position in a specific range designed in an HUD,
 wherein the controller adjusts a distance to a flat mirror that reflects the HUD information on a screen onto which the HUD information is outputted, in order to adjust the virtual image formation position of the HUD information in response to the distance information from the vehicle to the obstacle, and
 wherein when the flat mirror is moved close to or away from the screen, the controller adjusts a reflection angle of the flat mirror depending on a moving distance of the flat mirror such that a center of the HUD information which is reflected from the flat mirror and transmitted to an aspheric mirror is not changed.

2. The HUD control apparatus of claim 1, wherein the controller moves the flat mirror away from or close to the screen, using a motor.

3. The HUD control apparatus of claim 1, wherein a distance for moving the flat mirror in response to the distance from the vehicle to the obstacle is previously stored in a form of a lookup table in a memory.

4. The HUD control apparatus of claim 1, wherein the controller adjusts the reflection angle of the flat mirror using a motor.

5. The HUD control apparatus of claim 1, wherein the reflection angle of the flat mirror, which is to be adjusted according to the moving distance of the flat mirror, is previously stored in a form of a lookup table in a memory.

6. An HUD control method comprising:
sensing, by a controller, an obstacle in front of a vehicle through an obstacle sensor;
detecting, by the controller, a distance to the obstacle from the vehicle through a distance detector;
adjusting, by the controller, a virtual image formation position of HUD information to a closer position in response to the distance so that the HUD information does not overlap the obstacle on a windshield of the vehicle, when the obstacle is located at a closer position than a virtual image formation position in a specific range designed in an HUD, and
adjusting, by the controller, a reflection angle of a flat mirror such that a center of the HUD information which is reflected from the flat mirror and transmitted to an aspheric mirror is not changed, when the flat mirror is moved close to or away from a screen,
wherein in the adjusting of the virtual image formation position, the controller adjusts a distance to the flat mirror that reflects the HUD information on the screen onto which the HUD information is outputted, to adjust the virtual image formation position of the HUD information in response to the distance information from the vehicle to the obstacle.

7. The HUD control method of claim 6, wherein the controller moves the flat mirror away from or close to the screen, using a motor, and
a distance for moving the flat mirror in response to the distance from the vehicle to the obstacle is previously stored in a form of a lookup table in a memory.

8. The HUD control method of claim 6, wherein the controller adjusts the reflection angle of the flat mirror using a motor, and
the reflection angle of the flat mirror, which is to be adjusted according to a moving distance of the flat mirror, is previously stored in a form of a lookup table in a memory.

* * * * *